United States Patent [19]
Mutch

[11] 3,832,427
[45] Aug. 27, 1974

[54] PROCESS FOR CONTINUOUSLY FORMING A POLYMERIC RESINOUS LAYER FROM A MULTICOMPONENT LIQUID REACTIVE MIXTURE

[75] Inventor: John Mutch, Hartest, England

[73] Assignee: Guthrie Industries Limited, London, England

[22] Filed: Mar. 29, 1972

[21] Appl. No.: 239,196

Related U.S. Application Data

[63] Continuation-in-part of Ser. No. 865,357, Oct. 10, 1969, abandoned.

[30] Foreign Application Priority Data
Oct. 14, 1968  Great Britain .................... 48678/68

[52] U.S. Cl........ 264/39, 117/126 GB, 117/126 GE, 117/126 GS, 117/155 R, 260/2.5 AY, 264/49, 264/54, 264/177 R, 264/331, 264/DIG. 61, 264/DIG. 77, 425/182, 425/466
[51] Int. Cl...... B08b 3/08, B29d 7/08, B29d 27/04, B29f 3/04
[58] Field of Search ........ 264/54, 331, DIG. 61, 39, 264/DIG. 77, 176 R, 177 R; 260/2.5 BD, 2.5 AY; 117/126 GB, 126 GE, 126 GS, 155 R; 425/182, 466

[56] References Cited
UNITED STATES PATENTS

| | | | |
|---|---|---|---|
| 2,835,925 | 5/1958 | Proctor | 264/39 |
| 2,956,310 | 10/1960 | Roop et al. | 260/2.5 BD UX |
| 3,170,972 | 2/1965 | Knipp et al. | 264/54 X |
| 3,279,501 | 10/1966 | Donald | 264/209 X |
| 3,419,934 | 1/1969 | Lovett | 264/54 UX |
| 3,421,932 | 1/1969 | McGregor et al. | 260/2.5 BD X |
| 3,505,448 | 4/1970 | Zijp et al. | 264/331 X |
| 3,726,951 | 4/1973 | Smith et al. | 260/2.5 BD X |

OTHER PUBLICATIONS

Knox, R. E. "New Portable Helix Mixer for Polyurethane Foam," Dupont Bulletins New Information about Urethane Foam made with Dupont Hylene, A–3178, Wilmington, Del., E. I. du Pont de Nemours & Co. (Inc.), Elastomer Chemicals Dept., June 17, 1963, 4 pp.

*Primary Examiner*—Philip E. Anderson
*Attorney, Agent, or Firm*—Wenderoth, Lind & Ponack

[57] ABSTRACT

Layers, either coatings or self-supporting films or sheets, of plastics such as polyurethanes resulting from reactive multi-component mixes having a very short pot life are produced by extruding the mix through an extrusion die having a slit shaped orifice and internal passageways designed to equalize flow to all points along the length of the orifice. The extrusion die is arranged so that all the surface of the passageways can be exposed for manual cleaning in a very short time interval after extrusion ceases so that the reactive mix can be removed by brushing or scraping from the surfaces before it is fully gelled.

3 Claims, 14 Drawing Figures

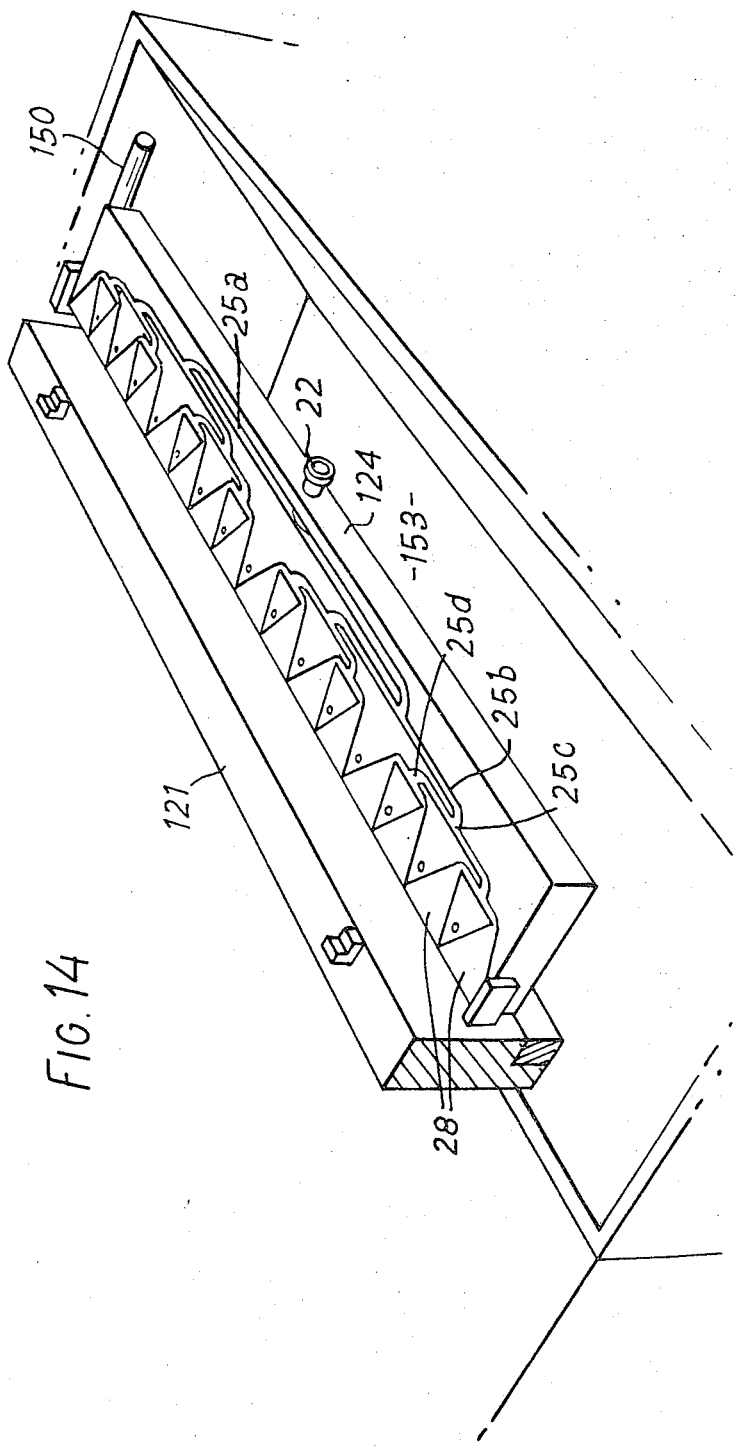

3,832,427

PROCESS FOR CONTINUOUSLY FORMING A POLYMERIC RESINOUS LAYER FROM A MULTICOMPONENT LIQUID REACTIVE MIXTURE

The present application is a continuation-in-part of application Ser. No. 865,357, filed Oct. 10th, 1969 and now abandoned.

The present invention relates to a process for the production of layers of plastics materials, formed from multi-component reactive mixtures having a limited pot life. The term "layers" is employed herein to cover thick or thin layers of such materials in the form of sheets or films or coatings applied to substrate materials.

Multi-component reactive mixes are characterized by rapid increase of viscosity as the reaction proceeds. The mixes when first formed (after initial heating of the individual components, if necessary) are relatively fluid. Plastics materials formed from multi-component reactive mixes are, in many instances, characterized by a high degree of cross-linking and in such case are substantially insoluble in organic solvents when the reaction is completed. They are frequently also highly adhesive to metal surfaces, with which they are in contact during the reaction.

It is well known to form continuous layers of thermoplastic resins for the production of films or coated fabrics by extruding the molten resin under great pressure through a die having a slit orifice. However, extruded thermoplastic resins have high viscosity and low fluidity and in consequence such materials do not key to woven fabric substrates in a wholly satisfactory manner, because they have failed to key in the interstices of the fabric. This method has not been applied to the formation of layers of resins produced from multi-component reactive mixtures because of the danger of clogging in the event of any interruption in the supply of the composition to the die, either at shut-down at the end of the day or through unexpected interruption. Normal thermoplastic resins are cleared from the internal surfaces of the die after shut-down by heating the die to the softening temperature of the resin and recommencing the extrusion process. However, that expedient is not applicable to the products of reactive mixes. Heretofore the only practical method of forming continuous layers from multi-component reactive mixtures has been by spraying, but that technique has the disadvantage that the product contains small air bubbles, which adversely affect its physical properties. The object of the invention is to form continuous layers of such compositions in which self-supporting webs or coatings of improved physical properties may be formed from a resin material, produced from a reactive resin mix.

The present invention is applicable to the formation of layers from all types of setting or cross-linked plastics compositions which result from the reaction of one or more basic materials with a curing agent or catalyst, with or without the application of heat to accelerate the reaction. An example of the type of resin just mentioned is a polyurethane formed by reaction of a resin containing hydroxyl groups with an isocyanate. Other well known examples of cross-linked resins which may be formed from a reaction between two or more reagents, or from a blend of one or more monomers and a catalyst are polyureas, polysulphides, polyesters, epoxies, acrylics and silicones. Many of these resins can be produced in either thermoplastic or cross-linked thermoset form, and many of them are foamable.

When it is desired to produce layers (either sheets or coatings) of such materials, it is desirable that the interval between the formation of the layer and the gelling of the layer as the result of the reaction of the components shall be as short as possible. If there is a long interval before gelling is completed, the rate at which layer material can be produced on an apparatus of practical size is unduly low, since the layer material cannot be formed into a storage roll or cut and stacked in sheet form until gelling is completed, since adjacent layers would adhere to one another.

The chemical reactions leading to the formation of a resin from a reactive mix are generally irreversible. Once the components have been mixed, the reaction will be substantially completed without external heating within a time (called the "pot life" or "gel time" of the material) at the temperature at which the materials are mixed. The pot life or gel time depends on the composition of the material and the gelling of the material is accelerated as the temperature is increased. For a high rate of production of layer material the pot life of the mix should be short, generally below 5 minutes, although the process of the present invention is useful with reactive mixes having longer pot lifes, for example 20 minutes.

With cold cross-linking resin compositions (including compositions the setting of which is conveniently accelerated by the application of heat), the fully cured composition is frequently very adhesive to metal surfaces, but the reaction can be substantially retarded and the mix maintained in a relatively soft condition by contact with a solvent for at least one of the components, before gelling is completed, so that the composition may be removed from a metal surface by contact with a solvent well within the pot life of the composition, followed by rubbing or scraping of the surface.

The present invention is based on the appreciation that the object of producing self-supporting webs or coatings of such resin materials of improved physical properties could be achieved if the reacting mixture could be extruded through an extrusion die having a slit orifice. However, the production of layer material on an industrial scale by extrusion could only be performed if all reacting material could be removed by an operator with reasonable certainty from all the passages of the apparatus, by means of which it is extruded in layer form, within the pot life of the mixture in the event of a planned or unplanned stoppage of the supply of mixture. To this end the present invention relies on the employment of apparatus including an extrusion die which may be opened to completely expose, for manual cleaning by scraping or rubbing, the whole of the surfaces defining the passage or passages through which the mixture flows to the extrusion orifice. If the die is constructed so that it can be opened very rapidly, the mixture can be attacked by the operator with solvents and removed from the die surfaces before it can fully set.

According to the present invention a layer of a plastics material, formed from a multi-component reactive mixture, is produced by continuously mixing the components of said mixture, passing the mixture in a somewhat viscous but readily flowable condition in a substantially uniform stream through an extended slit-shaped die orifice and on to a receiving surface at such rate that the dwell time of the mixture between its formation and its emergence from the die orifice is a small fraction of the pot life or gel time of the mixture, said die orifice and receiving surface being moved in relation to each other in a direction transverse to the length of the die orifice, periodically discontinuing the supply of mixture to the die orifice and exposing the surfaces of the passages through which the mixture flows to said die orifices and cleaning said surfaces before the mix becomes fully gelled. Preferably the pot life or gel time of the mix is in the range of 2–15 minutes whilst the dwell time of the reactive mix in the die is no more than about 5 seconds.

Since the time required to open the die and clean down the die surfaces is irreducible beyond a certain value and, as already pointed out, the pot life of the mixture should be as short as is consistent with avoiding setting of the reactive mix in the die, the volume of the passage between the inlet for the mixture and the die orifice is kept as small as practicable in order that the dwell time of the mixture may be no more than about 5 seconds, as stated above. There must also be no "dead spots" in the stream of mixture, at which the reactive mixture may form deposits of solidified material and the passages in the applicator die require careful construction to avoid the formation of such "dead spots."

The invention provides also an applicator apparatus incorporating means for continuously mixing the components of a multi-component reactive mixture and supplying the mixture to a die having an inlet for supply thereto of a stream of said mixture in a somewhat viscous but readily flowable condition under pressure and comprising two members which are relatively movable between an open and a closed position, in which they co-operate to define a slit-like orifice and a plurality of branched passages leading from the inlet to the orifice which provide paths of substantially equal flow resistance from the inlet to all points along the orifice, and an open position in which the surfaces defining said passages are wholly exposed for manual cleaning; and quick-release holding means for holding the members in closed position, whereby after interruption of the supply of the multi-component reactive mix and release of the holding means the members are movable to said open position for manual access to the whole of the passage surfaces for cleaning and means for moving a surface, on which a layer of said mixture is deposited, relatively to said die in such manner that the distance between the die orifice and the surface is constant and the relative movement is in a direction transverse to the length of the orifice slit.

The invention contemplates that the applicator may be moved over a surface, such as a floor, to deposit the layer thereon. Commonly, however, the applicator is stationary and the surface is moved.

Where the layer is intended as a self-supporting film or sheet, the moving surface is in the form of a belt, having a release coating such as silicone rubber, from which the layer may be stripped after it has set.

More usually the layer will be caused to set on a web of a substrate so as to be permanently secured thereto. Coatings can be applied to a variety of substrates such as textile fabrics or carpets. The resin mixture may be formulated to possess or to develop a degree of thixotropy to prevent excessive penetration into the weave of the fabric or carpet after deposition thereon. These resins may be foamable if desired.

In another application of the process of the invention the substrate may be a foam material, flexible or rigid, on which the deposited layer of cross-linking resin forms a facing. A particular application envisaged for the process of the invention is the production of conveyor belting so that advantage may be taken of the exceptional strength and resistance of known polyurethanes derived from polyether and polyester resins.

Various multi-layer constructions can be made by means of the invention. Thus in one method a second web is laid on top of and pressed against the exposed surface of the deposited layer before it has set so as to be bonded thereto. Alternatively, the coated substrate is reversed after the layer has set and a second layer is deposited on the reverse side of the substrate.

Laminated materials such as building panels may be made in this way. The reactive mixture may be applied to the surface of one sheet-like component part of the panel, and the second sheet-like component part placed on the first, and the assembly passed through a pair of nip rolls all within the pot life of the reactive mixture. By the time the panel assembly has passed through the nip rolls the resin mixture will have polymerized to a sufficiently viscous state to hold the components of the panel together under conditions of stacking. The resin acts as an adhesive.

In a further example of a laminated structure contemplated by the present invention, tufted carpet may be backed by this means instead of the conventional latex or hot melt backing techniques to give products which may have a non-foamed or a foamed backing, and which if desired may have a secondary backing of, for example, hessian, adhered to the plastic backing.

Particulate material may be applied to the resin layer before it has set so as to be permanently secured to it. Thus aggregates, decorative chippings or other particles may be applied in a random or regular manner such that on setting of the resin the particles are bedded in the resin layer to provide, for example, a hard-wearing or decorative surface.

As already explained, it is an essential of the invention that the whole of the surfaces of the flow passages leading to the die orifice may be exposed rapidly for manual cleaning. To facilitate this, the passages defined by the two members of the applicator die are preferably formed as recesses in one member which butts against a flat surface of the other member when the members are in closed position. Conveniently, the two members are hinged about an axis extending along the lower edge of the die and the member, in which the passages are formed hinges downwardly on opening the die, so that the flat surface is substantially vertical and the recessed surface may face upwardly for cleaning. The applicator die is preferably movable away from working position to a cleaning station, where it can quickly be opened and the passages cleaned out with the aid of solvent over a drainage trough, equipped with a fume hood.

In an alternative arrangement the die member, having a plain flat surface, remains stationary, whilst the other die member is withdrawn from it and, after a predetermined movement, is turned so that its operative face is turned upwards to facilitate manual cleaning.

Various forms of quick-release holding means are contemplated, for example, hydraulically operated toggles and quick release bolts: electromagnetic holding means may be the quickest to operate. It is to be borne in mind that very large forces may arise in the die, tending to separate the die members. These forces are at the maximum in the lower part of the diehead, so that in addition to holding means positioned near the top edges of the die members to prevent pivotal movement about the hinge, it is necessary to provide additional quick release holding means near the bottom edge of the die to prevent bowing of the die members. These additional holding means must be positioned to avoid interference with flow of the material.

In the alternative die arrangement the two die parts are preferably held together by a single row of bolts, since it is found that these may be released very rapidly by a standard nut runner operated form the factory air line. This expedient ensures that the die is always tightened to the same extent at closing.

A further important feature of the invention lies in the equalization of resistance between the inlet and all points along the orifice slit. In a preferred arrangement of the die, the inlet is centrally placed at the top of the die, and the passages include similar triangular spaces the bases whereof lie in a line parallel to the a little above the orifice slit, and the apices of which are connected to the inlet by conduits of equal length and flow resistance: the conduits preferably branch successively and symmetrically from the inlet to the triangular spaces.

In order to permit adjustment to compensate for any irregularity in the die passages, one lip of the die is formed by a separate member, clamped to the appropriate die member, but subjected to local deformation by a series of adjustment screws arranged across the full width of the die member.

Embodiments of the apparatus for carrying out the invention will now be described by way of example with reference to the accompanying drawings, in which:

FIG. 14 is a semi-diagrammatic view of the die opened over a cleaning tray for cleaning purposes.

Figure 1:
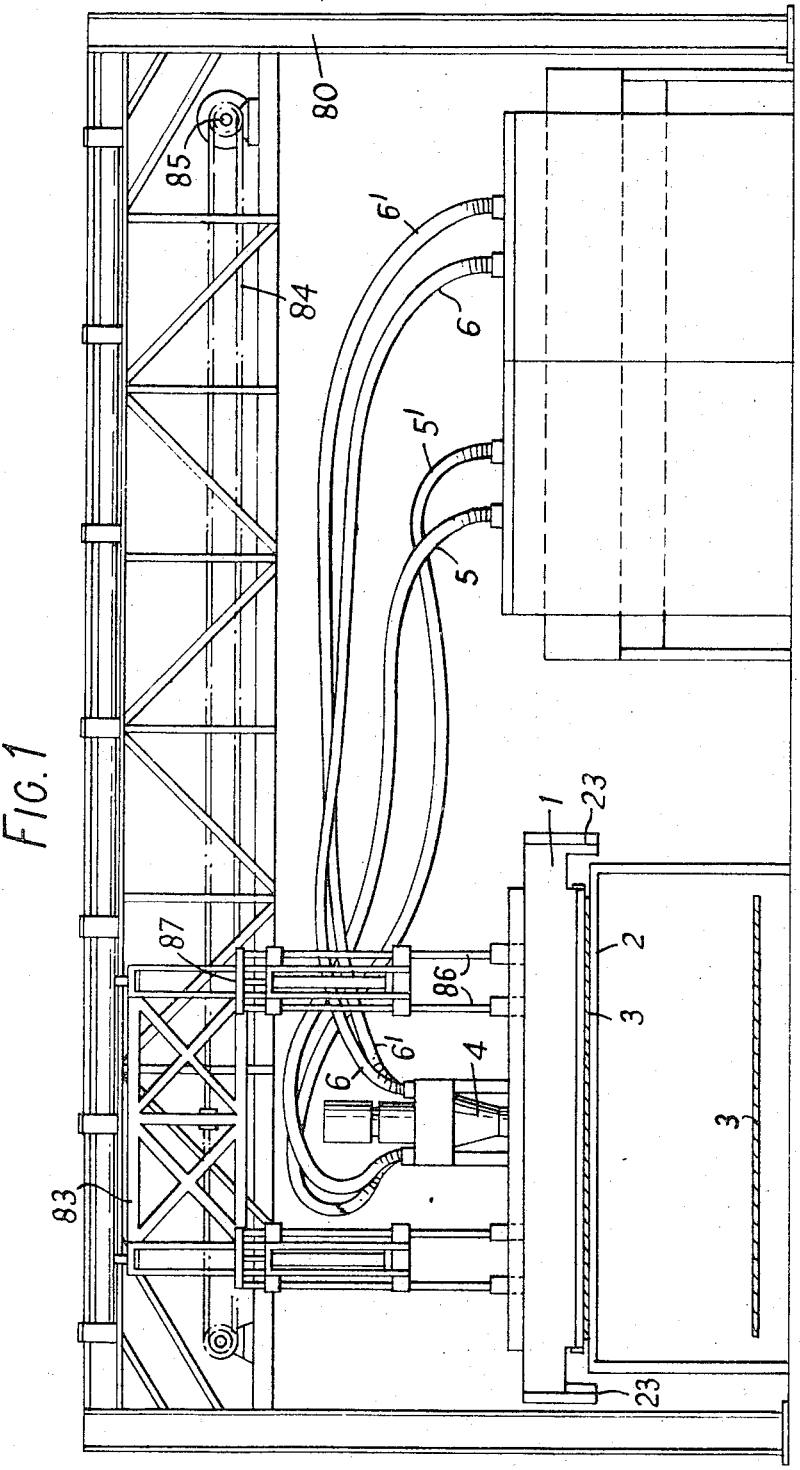
FIG. 1 is a cross section of apparatus for applying a layer of polyurethane to a web.
Figure 2:
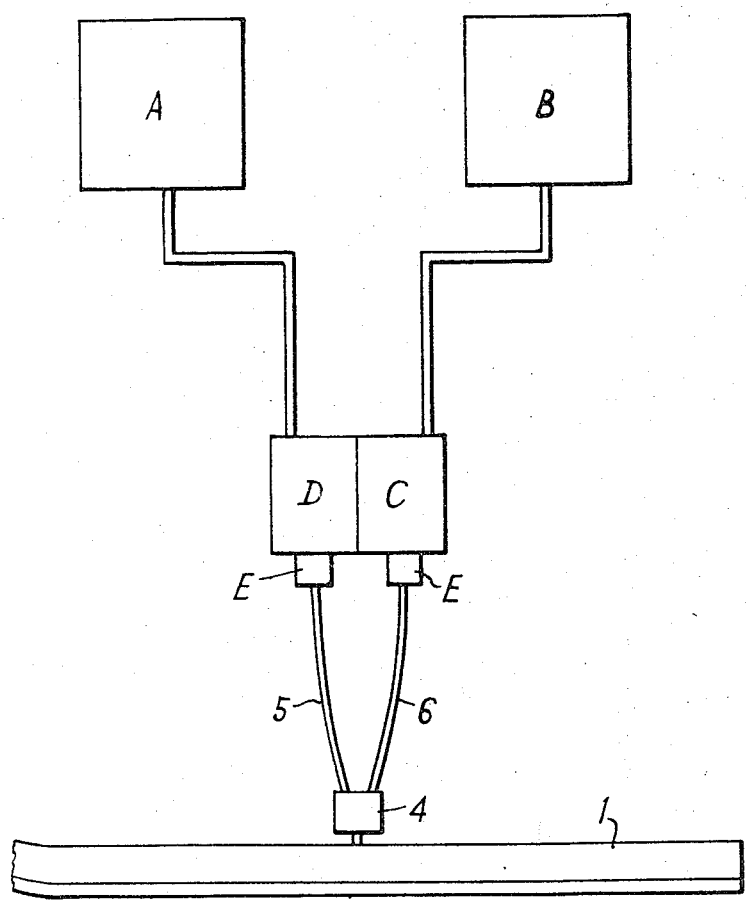
FIG. 2 is a block diagram showing the arrangements for supplying the component of the polyurethane to the applicator die forming part of the FIG. 1 apparatus.

Referring to FIG. 1, the apparatus comprises an applicator die 1 extending over the width of a table 2 on which is supported the upper run of a conveyor 3, which in turn supports a web of fabric to be coated or a web of release material on which a self-supporting layer of plastics material is to be formed. The applicator die 1 is supplied with a reactive mix from a mixer 4 to which the components of the mix are supplied separately under high pressure to maintain a pressure of the order of 20–500 lbs/square inch in the mixer. The mixer 4 is of simple construction, having a rapidly rotating paddle arranged in a conical body. The apparatus operates most satisfactorily when the mixer pressure is in the order of 100–250 lbs/square inch. The mix is supplied through flexible tubes 5, 6 by a suitable pumping and metering arrangement, which is indicated diagrammatically in FIG. 2. The components are taken from bulk stores A, B respectively to working stores D, C and thence through metering and pressure units E to the tubes 5, 6. There are also return tubes 5' and 6' to lead back the components to their respective tanks when the mixer is not operative. The supply system is conventional for the purpose and preferably includes jacketing for the tubes 5, 5' and 6, 6' so that heating fluid may be circulated around them to maintain the viscosity of the components at a desired value. In some cases one or both components are solid or of very high viscosity at room temperature.

The applicator die has a narrow slit orifice 7 (FIG. 3), which extends over its full width and from which the reacting mix is ejected in a viscous but readily flowable state. At this stage the viscosity of the mix is typically 1–20 poises. The mix is extruded in the form of a thin coating which deposits itself on whatever material is being carried by the conveyor 3 and becomes united therewith if its surface is of a suitable nature. It is one of the major advantages of the process of the present invention that the emission of the reactive mix in the form of a readily flowable material enables greatly superior penetration of woven fabrics to be obtained than is possible where a molten thermoplastic resin is extruded onto a woven fabric substrate by a conventional extrusion process and thus allows the production of superior products. The reaction of the components of the mix begins immediately the two materials are brought together in the mixer 4 and takes place rapidly at this stage. The setting or gelling of the mix must be completed before the deposited layer reaches the end of the upper run of the conveyor 3 and to enable this to be achieved with high production rates, overhead infrared radiators (not shown) are preferably arranged over the table to heat the deposited layer of mixture as it is carried past. The gelled layer of polyurethane or like material is carried forward to a position for cooling and/or dusting which will render it suitable for being formed into a roll or for other desired handling.

The applicator die 1 may be arranged at a distance of for example 15 feet (5 metres) from the ingoing end of the conveyor 3 so that sheets of relatively stiff or rigid material may be fed on the conveyor for the application thereto of a coating by the die. However, if the apparatus is to be employed solely for coating continuous webs of flexible materials (either fabrics or release material) it is possible to place the die at the ingoing end of the conveyor and then it is possible to dispense with the gantry by which the applicator die 1 is moved from its operative position to its cleaning station. Where the die is at the ingoing end of the conveyor it is possible to clean it in situ without fouling the conveyor (or the web which it carries) with the washing fluid for the die surfaces.

Figure 5:
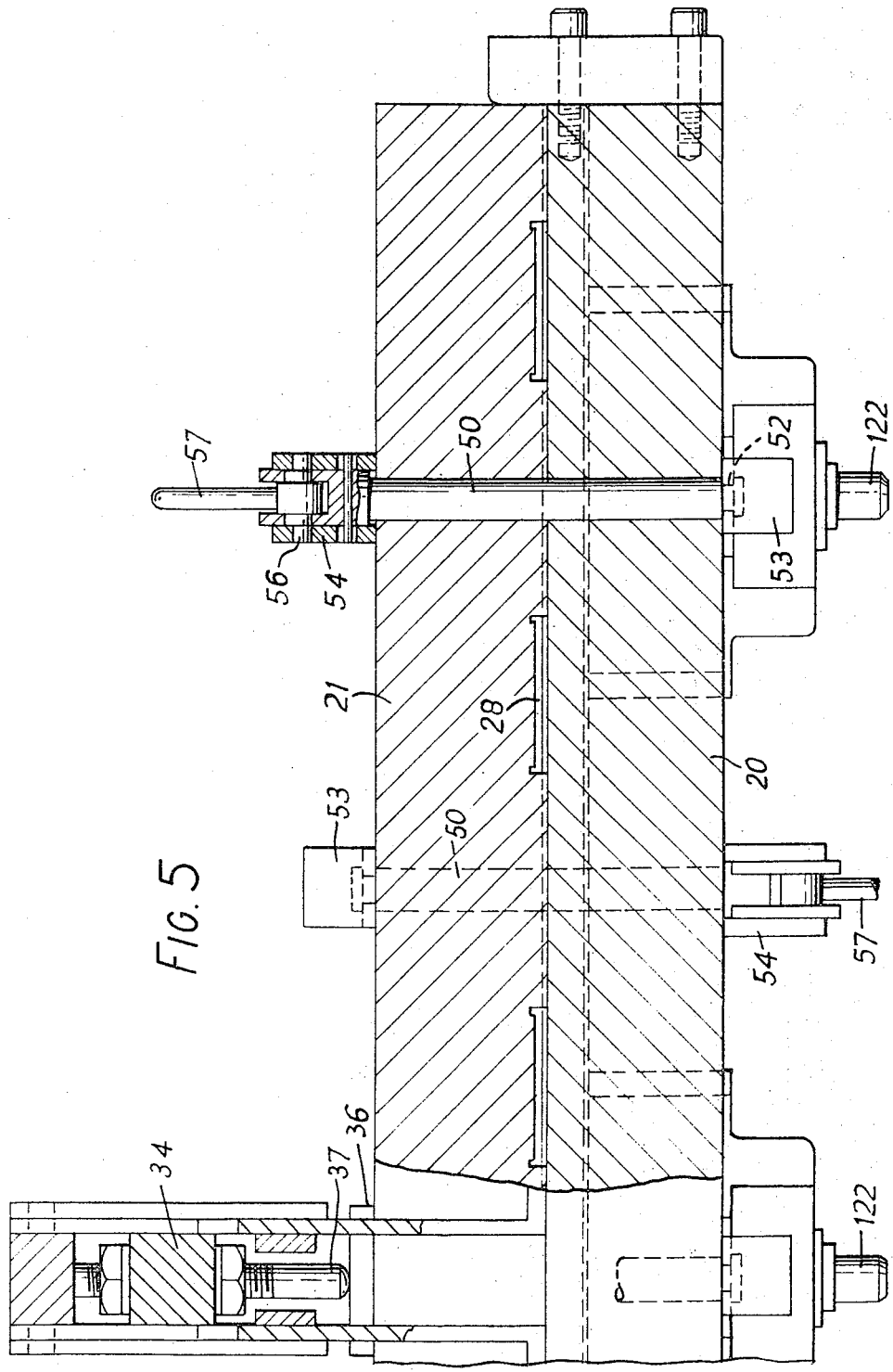
FIG. 5 is a partial transverse sectional view corresponding to FIG. 3.
Figure 6:
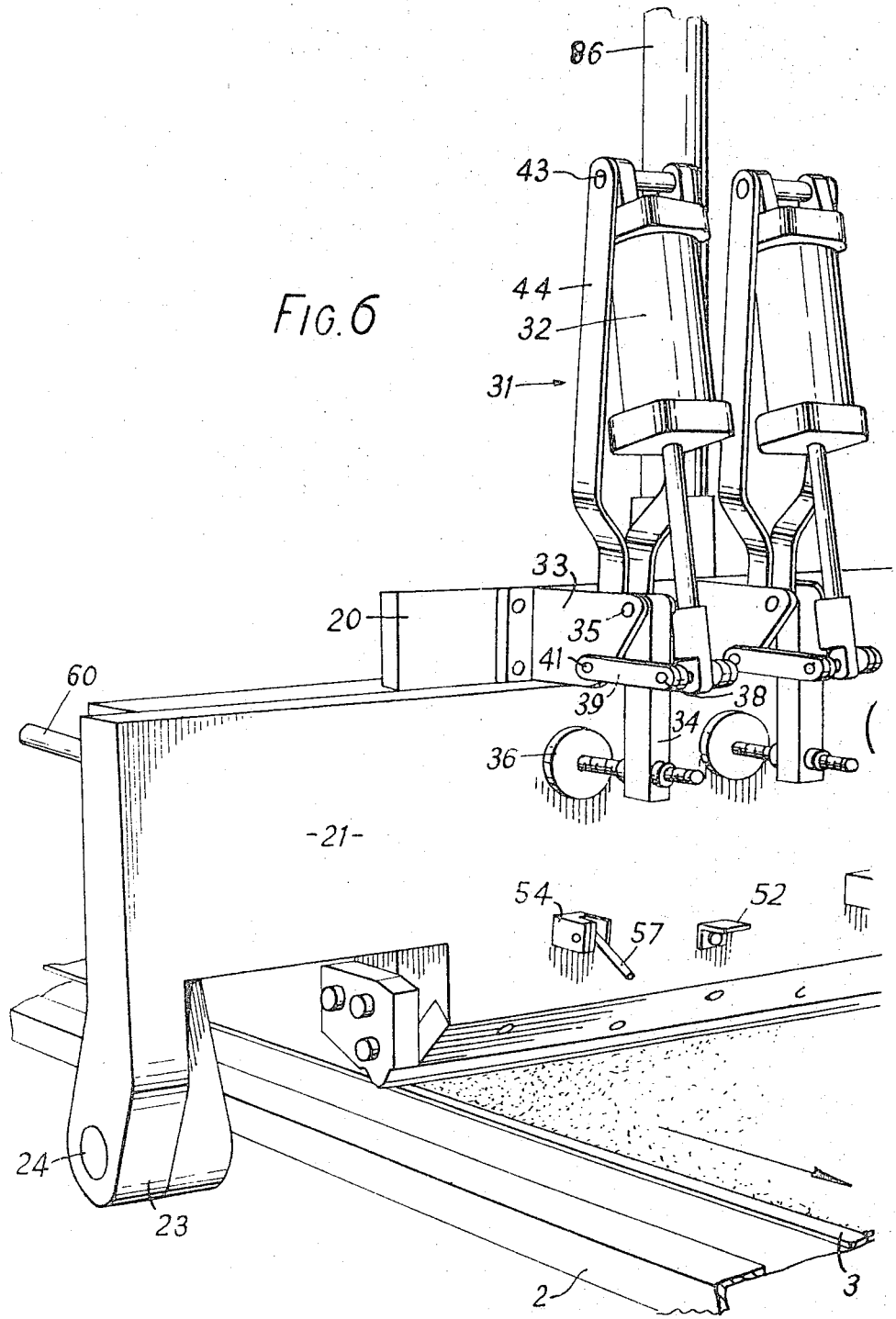
FIG. 6 is a partial view of the applicator die illustrating the die clamps.
Figure 7:
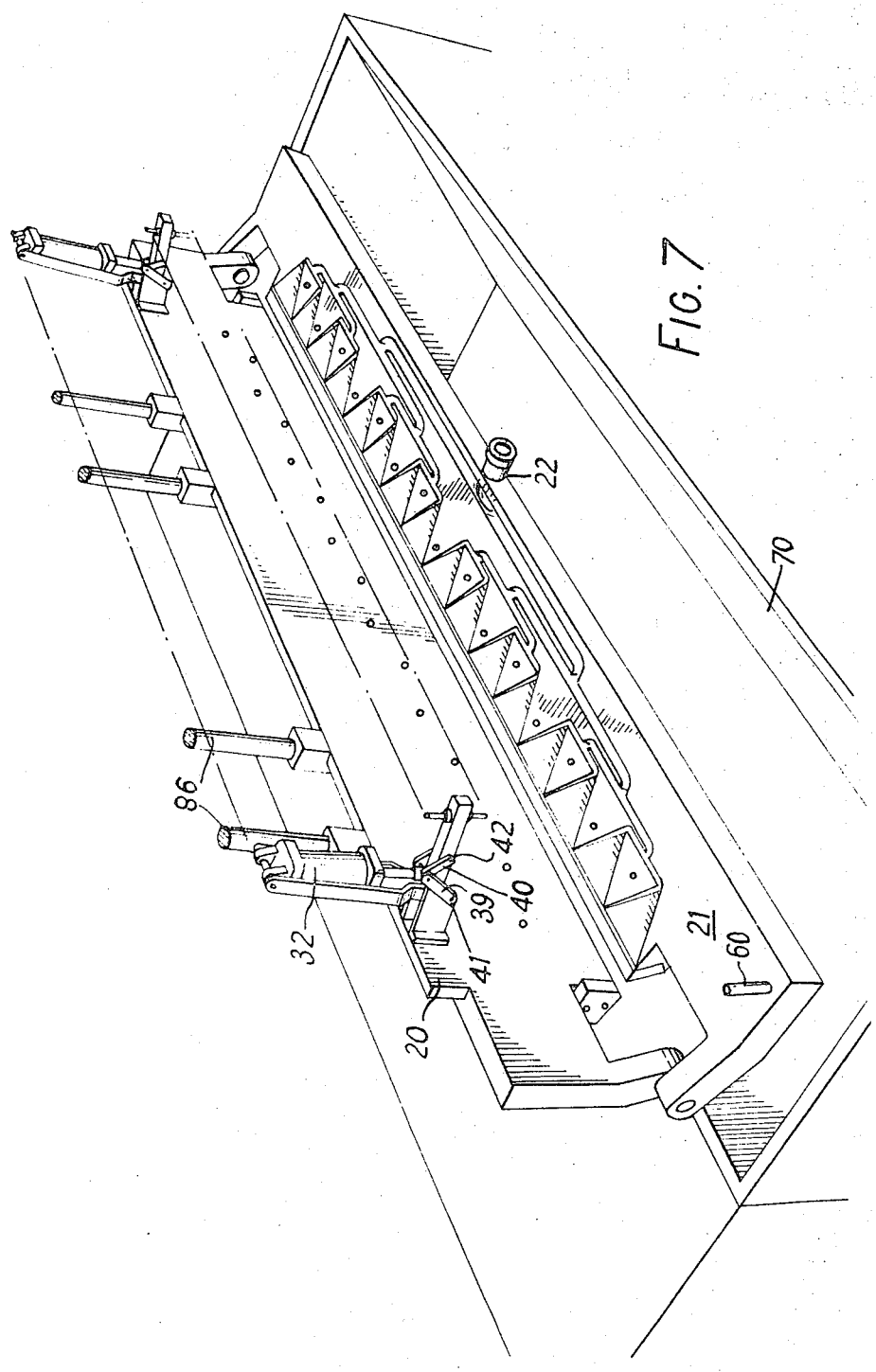
FIG. 7 is a perspective view of the applicator die opened for cleaning.

Referring now to FIGS. 3 to 6, the applicator die there illustrated comprises essentially two main members, the back plate 20 and the front plate 21 which extend over the whole width of the table 2. The back plate 20 is fixed. The front plate 21 carries the inlet 22 for the mixed polyurethane components from the mixer 4. The outlet of the mixer 4 is connected to the inlet 22 by means of a quick-release clip (not shown). The front and back plates 21, 20 define between them the orifice 7. The front plate 21 is connected to the back plate 20 by means of stout hinges 23 at both ends of the plates for movement of the front plate about the pivot axis 24 between the closed position illustrated in FIG. 3 and an open position wherein the front plate hangs down below the horizontal (as shown in FIG. 7). The front plate 21 is formed with passages, as will be described, which, with the co-operation of the flat surface of the back plate 20, lead the mix from the inlet 22 to the orifice 7 when the front plate is in the closed position as illustrated. These passages, which branch out from a single passage at the inlet 22, are designed to ensure uniform flow resistance to the mix from the inlet to any point along the length of the orifice 7, and to avoid "dead spots" where the mix could become stagnant and form local deposits of gelled material. The passages comprise a series of branching conduits 25a, 25b, 25c, 25d leading from the inlet 22 to the apices 27 of a series of triangular spaces or "fishtails" 28, the bases of which lie in a straight line parallel to the length of the orifice 7. The depth of the fishtails 28 decreases progressively from their apices to their bases, as may be seen in FIG. 3. Conduits 25a, 25b, 25c, 25d branch successively and symmetrically from the inlet 22 to the apices of the fishtails 28, so that the length of conduit and flow resistance between the inlet and the apex of each fishtail 28 is equal. Each fishtail is shaped at 28a at its edges so as to counteract local drag and thus equalize the flow across the base 29 of the fishtail. Below the fishtails there is a pressure equalizing and relieving groove 30 parallel to the orifice 7.

The lower portion 20a of the back plate 20 is mounted for adjustment towards and away from the front plate 21 for adjustment of the width of the orifice 7.

The member 20a is connected to a series of dovetailed carriers 20b, which engage with and slide on dovetails on the bottom of the member 20 and is provided with a sealing member 120, which lies in a groove 121 to prevent any escape of mix between members 20 and 20a. Movement of member 20a is effected by adjusting screws 122, which are threaded into bushes 123, secured in the member 20. The screws 122 are each provided with a plain integral collar 124, which is trapped in an adjuster screw housing 125 secured to the related carrier 20b. This arrangement permits the width of the orifice to be set at a series of positions across its width.

Although not so shown in the drawings, it is in some instances preferable to arrange that the lower edge of the die member 20 be lower than the edge of the die member 21 so that when the die is brought into contact with a fabric web there shall be a narrow gap between the die member 21 and the fabric web on the outgoing side of the die and this can lead to avoidance of air entrapment in the deposited layer in some circumstances.

Figure 3:
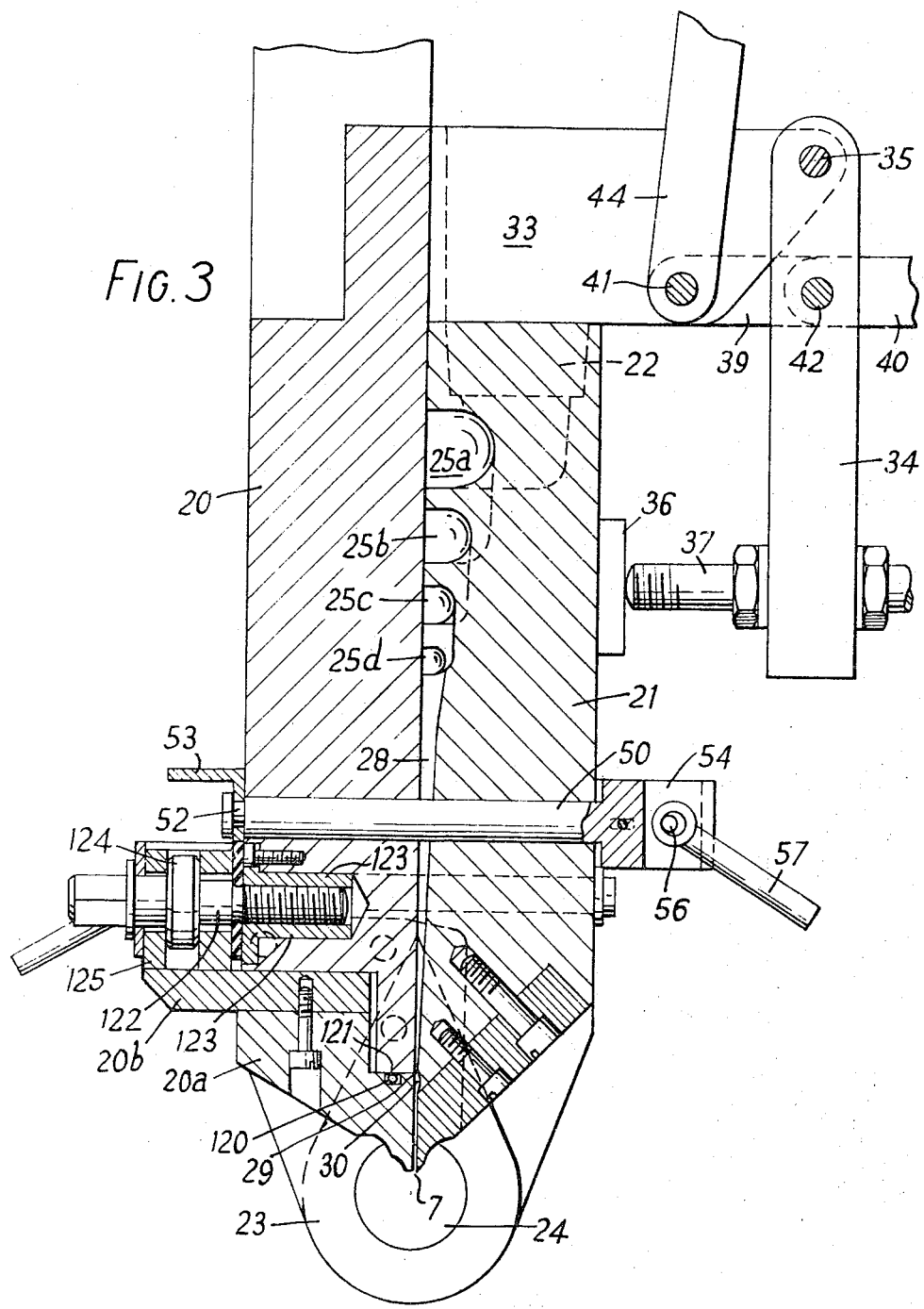
FIG. 3 is a partial vertical sectional view of the applicator die in closed position.

Quick-release means are employed for holding the members 20, 21 in their operative position. As pointed out above, two separate series of clamps are employed. A first set of clamps 31, best seen in FIGS. 3, 6 and 7, are operated by double-acting pneumatic cylinders 32. The clamps 31 each comprise a pair of brackets 33, secured to a portion of the member 20, which project above the top edge of the member 21. To the brackets 33, a clamp arm 34 is pivoted at 35 and presses against a clamp pad 36 on the member 21 through an adjusting screw 37. The piston rod of the pneumatic cylinder 32 is pivotally connected by a pin 38 to pairs of toggle links 39, 40, respectively pivoted to the brackets 33 at 41 and to the lever 34 at 42. The cylinder 32 is pivoted at 43 in a carrier 44, which is in turn pivotally connected to the brackets 33 by pin 41.

Although for reasons of clarity not all the clamping means 31 are shown in the drawings, they are provided to extend across the full width of the applicator die 1 at the spacing shown in FIG. 6, so as to provide a secure clamping effect and to prevent pivotal movement of the members 20, 21 about the hinge axis 24.

It will readily be understood that the clamping means 31 can be released in the course of a few seconds by actuation of the cylinders 32.

In addition to these clamping means, which act near the top edge of members 20, 21, a series of additional quickrelease clamp bolts 50 are provided near the bottom edges of the members 20 and 21 to prevent bowing of these members at points between the hinges 23.

Figure 4:
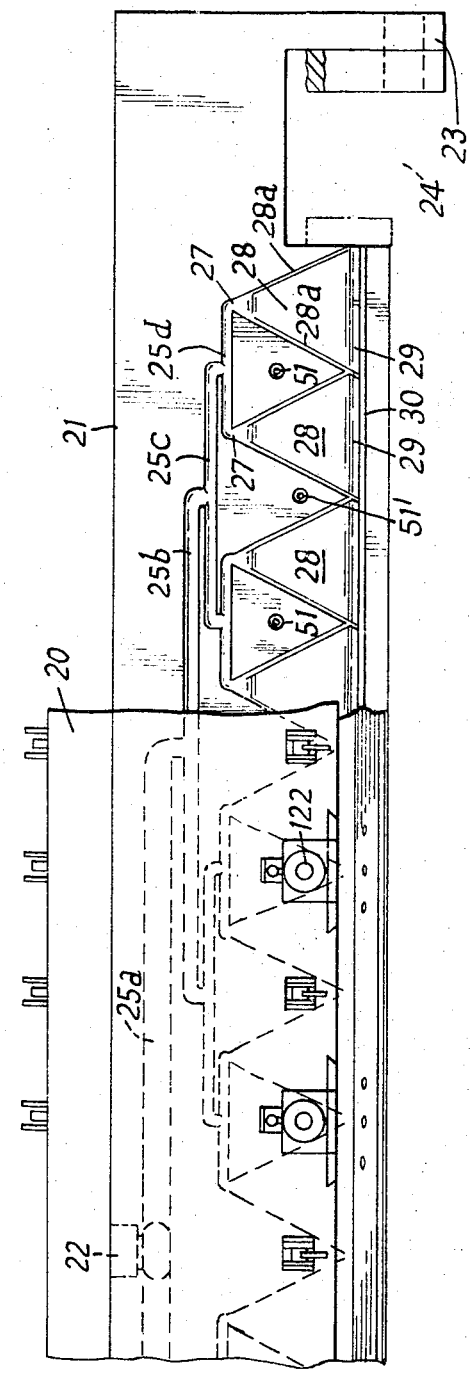
FIG. 4 is a partial elevation of the applicator die in the closed position with part of one die member cut away.

The construction of the clamp bolts 50 is best seen in FIGS. 3 and 5. The individual bolts pass through a pair of aligned apertures in the members 20, 21 at positions indicated at 51, 51' in FIG. 4 in the lands between adjacent fishtail grooves 28. The positions 51 and 51' are staggered because of the presence of the adjuster screws 124. Each bolt 50 has an annular groove 52 formed at one end thereof for engagement by an angular retainer plate 53, having a cut-away shape to engage such groove. At its opposite end the bolt 50 is threaded into an enlarged fork, which is slidably mounted between a pair of cheeks 54, in which is mounted an eccentric 56 engaged by a handle 57, so that by turning the handle 57 through a small angle the bolt may be moved longitudinally. When the bolt is inserted in the members 20, 21 and the retainer plate 53 put in position, movement of the handle 57 can develop a large clamping force. Conversely the bolt can be released and removed very quickly by releasing the handle 57 and picking off the retainer plate 53.

Although the quick release bolts 50 provide a very satisfactory method of securely but releasably clamping the lower parts of the die members 20, 21 to each other, both the bolts 50 and the pneumatic units 31 could be replaced by other means, for example, by powerful electromagnets mounted on the back of the plain die member 20. This would permit the release of the die members 20, 21 from each other to be effected even more quickly.

In the construction illustrated the movement of the die members 20, 21 between the open and closed positions is effected manually by means of a removable handle, which fits on the lever stub 60.

In operation a web of material is drawn past the orifice 7 of the applicator die 1 on the conveyor 3 at a minimum clearance whilst reactive mix is supplied to the applicator die 1 and extruded through the orifice 7 as already described above. Since in many instances the web may be a hard material, such as paper, it is desirable that the table 2 beneath the applicator should be somewhat resilient.

At the end of the coating operation the applicator die 1 is moved from its operating position over the table 2 to a cleaning station over a trough 70, where it is opened for cleaning as illustrated in FIG. 7. For this purpose the applicator die is carried on a gantry, see FIGS. 1 and 8.

The gantry 80 is provided with rails 81, 82 for a trolley 83, which may be traversed across the gantry by means of a drive chain 84, driven by a motor 85. The applicator die 1 is supported by rods 86 from crossheads 87, which may be moved in the vertical direction by pneumatic or hydraulic cylinders 88. The weight of the applicator die is counterbalanced in known manner by weight 90 connected to the crossheads 87 through cables 91.

Immediately at the end of an operation the controls are operated to lift the applicator die clear of the table 2 (the hinges 23 lie below the level of the table as shown in FIG. 1). At this time a solvent and air purge are blown through the mixer 4 and applicator die 1 in known manner to remove the bulk of the reactive mix inside them and to slow down gelation of the remainder. Because of the high speed of rotation of the paddle in the mixer the solvent purge has the effect of leaving the mixer substantially clean, but the internal surface of the die passages still need manual cleaning after the die is opened. In any event the simple shape of the mixer housing is such that its internal surface can readily be cleaned after the mixer paddle has been removed. The traversing motor 85 is switched on to carry the applicator die to the cleaning trough 70. As soon as the die is in motion the operators, preferably two in number, release the handles 57, remove the retainer plates 53 and withdraw the bolts 50. As soon as the applicator die 1 is in position over trough 70, the pneumatic clamps 31 are released. The die is then opened by operation of the stub lever 60 and the die member 21 is brought into the position illustrated in FIG. 7. It is a particular advantage of the hinge arrangement adopted for the applicator die 1 that the surfaces of die members 20 and 21 are available to an operator working from one side of the trough and that the surface of the member 21 with its arrangement of flow passages can be arranged at a convenient angle for manual cleaning, which may involve brushing and scraping.

The time interval required for moving the applicator die 1 from the operative position shown in FIG. 1 to the open position shown in FIG. 7 is less than thirty seconds. This permits the operators to achieve without undue difficulty the requirement that the die surfaces be cleaned down before the reactive mix has fully set.

Whilst the applicator die is shown as constructed with a plurality of galleries leading to a plurality of fishtails 28, it is possible to achieve the desired objective of supplying the reactive mix at the same rate at all positions along the orifice with a single fishtail when the width of the die is small - for example, up to 36 inches or, in some circumstances, even higher.

Figure 9:
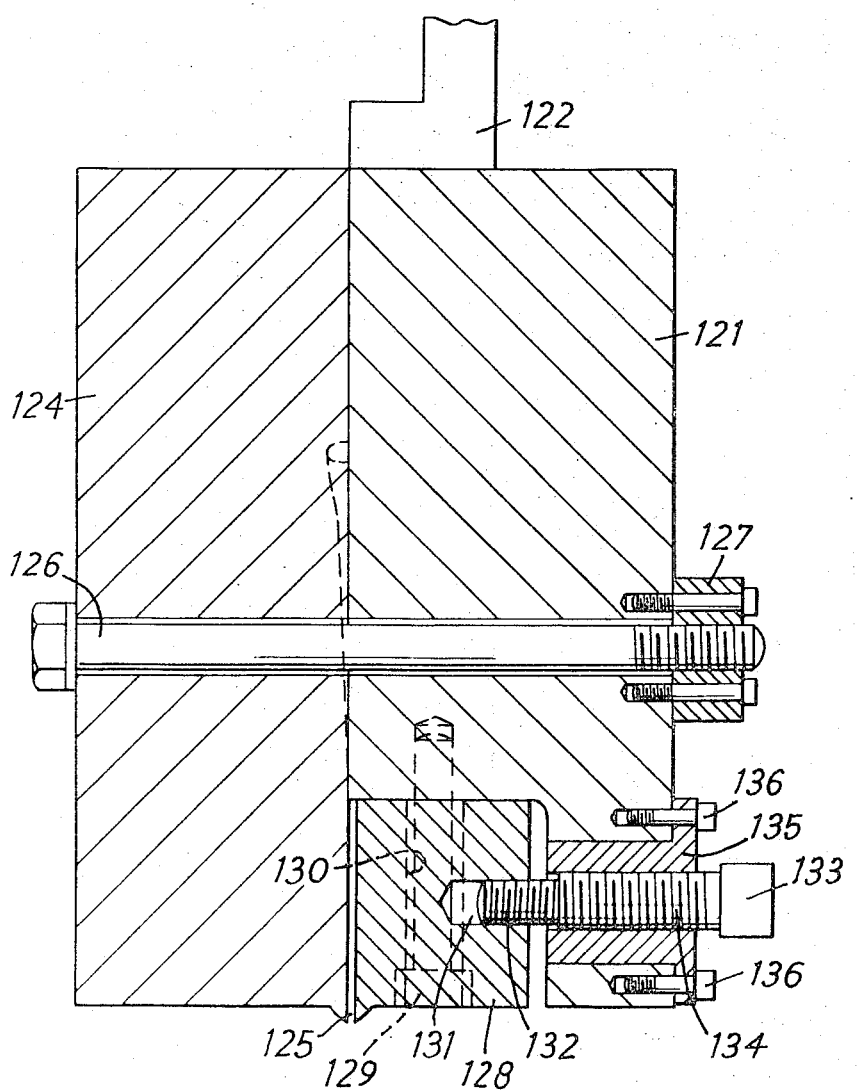
FIG. 9 is a cross section of a modified form of die on line 9—9 of FIG. 10.
Figure 10:
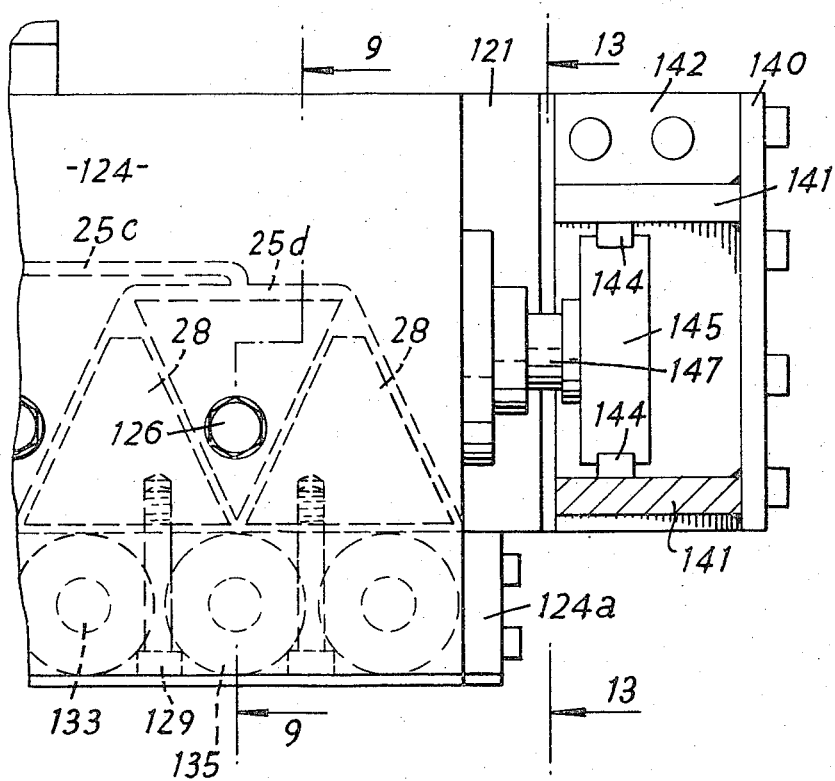
FIG. 10 is a part elevation of the modified form of die seen from the front.
Figure 11:
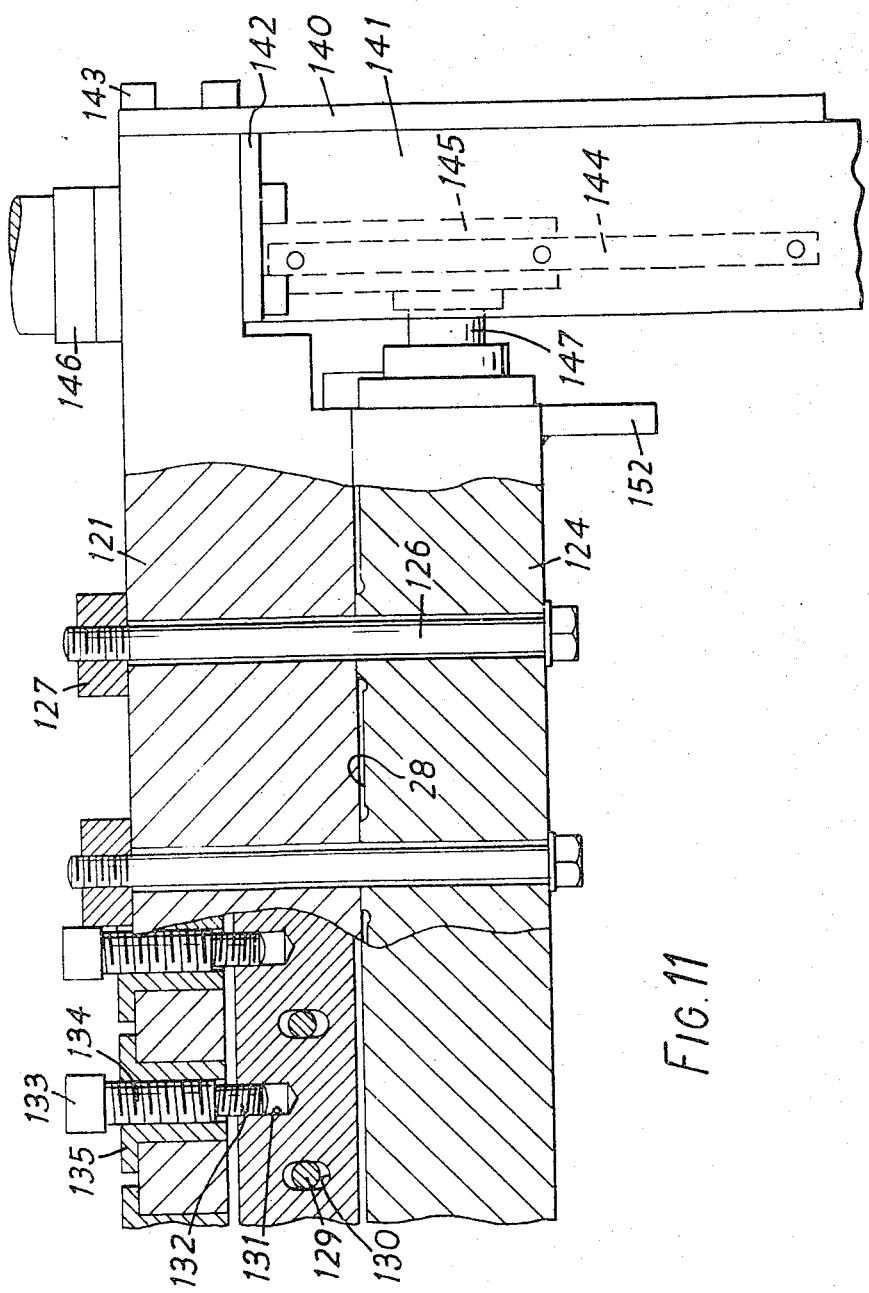
FIG. 11 is a part plan view corresponding to FIG. 10.
Figure 12:
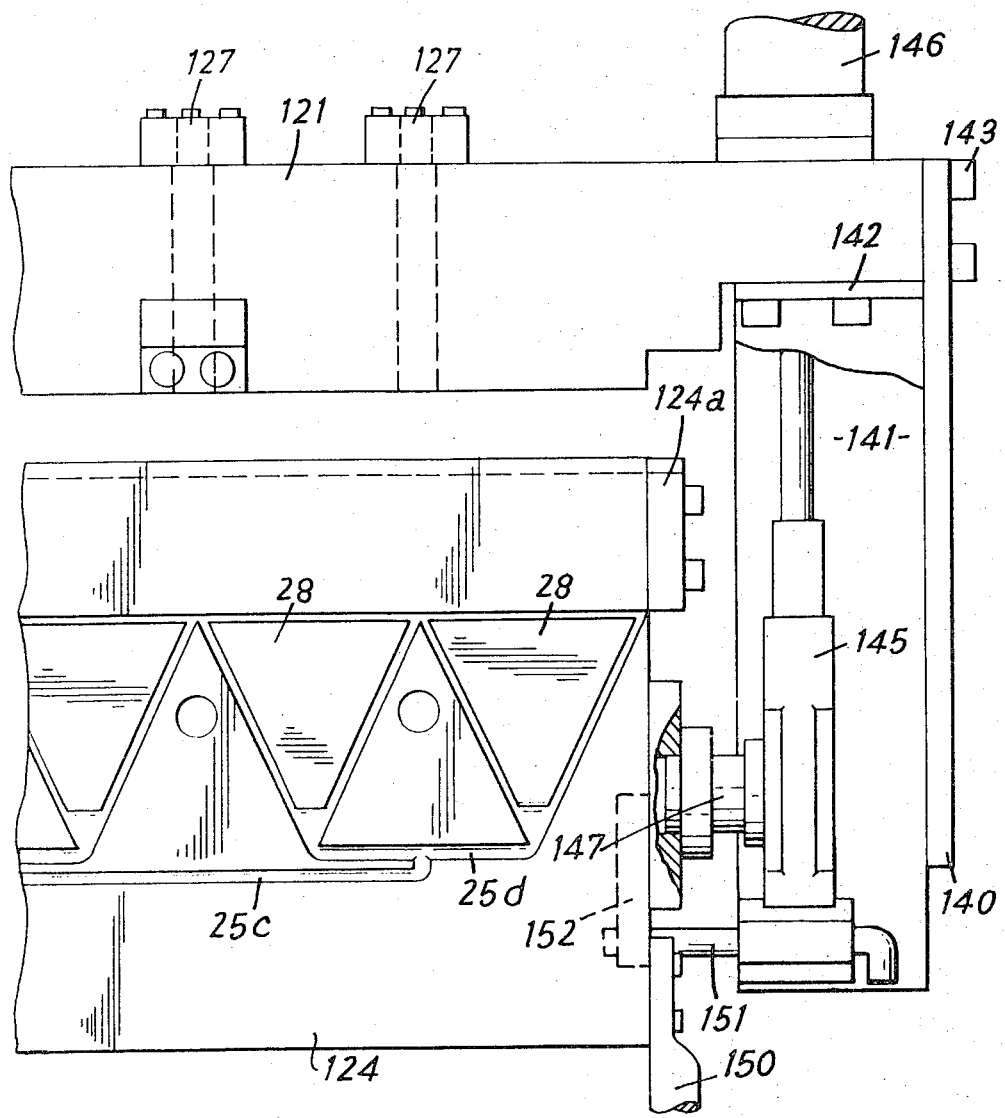
FIG. 12 is a part plan view of the modified die with the front die member opened and rotated to a horizontal position for cleaning.
Figure 13:
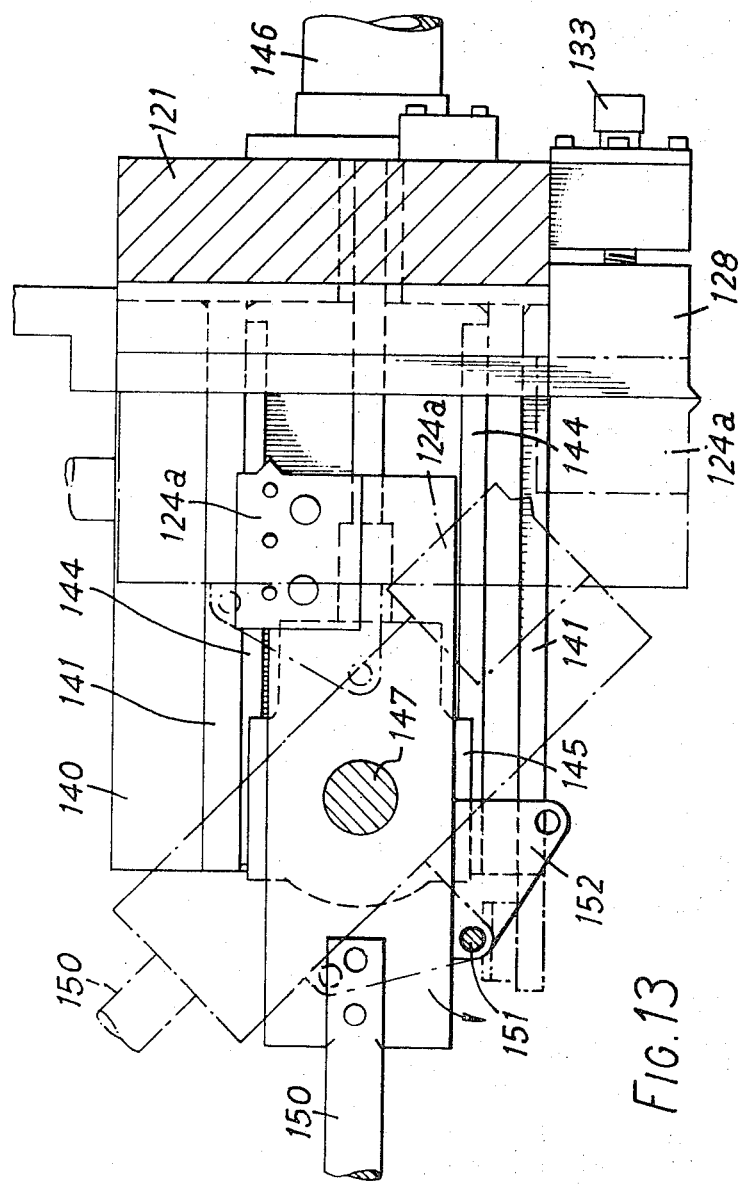
FIG. 13 is a partly diagrammatic end view of the die with the front die member indicated in the closed position and in the two positions for cleaning the die members on line 13—13 of FIG. 10.

In the modified die construction illustrated in FIG. 9 the die comprises two members which are separable from one another.

Figure 8:
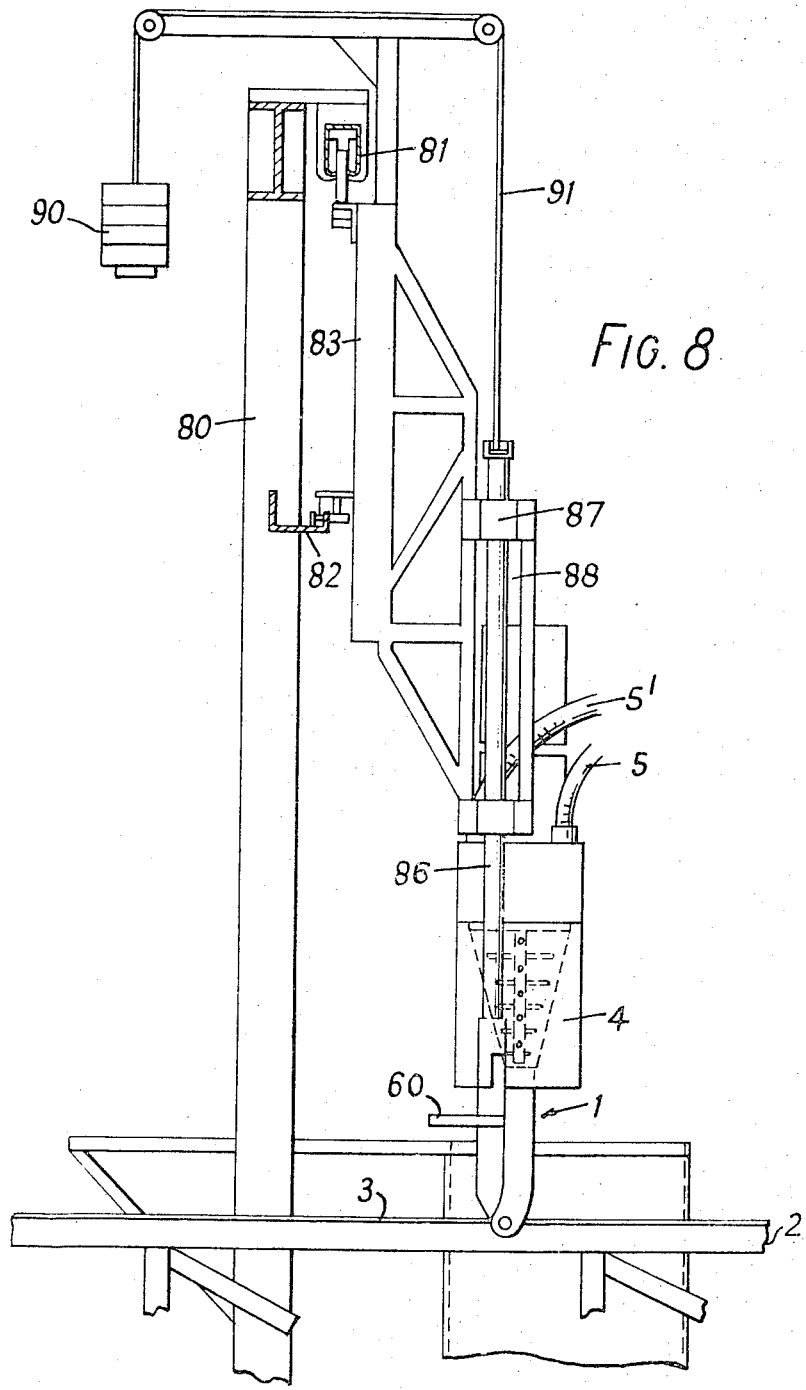
FIG. 8 is a section of the gantry and die support trolley shown in FIG. 1.

The die comprises a plain rear die member 121, which is supported by rods 86 and is movable in the vertical direction by elements identical with the parts 86 – 91, shown in FIGS. 1 and 8. Although the die may be supported on an identical support gantry to that shown in those figures, it is preferred to arrange that the die is not laterally movable and is arranged at the ingoing end of the conveyor as explained above. Thus the plain die member 121 is movable in only the vertical direction by rods (not shown) attached to a support block 122.

A front die member 124, provided with a similar array of passages, similar to the conduits 25a, 25b, 25c and 25d and "fishtails" 28, formed in the front plate 21 illustrated in FIGS. 3 and 4, for the same purpose of equalizing the resistance of flow to all positions along the length of the orifice 125 between the rear die member 121 and front die member 124. The sole connection between the front die member and the rear die member is constituted by a row of bolts 126, which engage threaded bosses 127 on the rear of the plain rear die member 121. These bolts are made of high tensile steel and are located at positions between adjacent fishtails 28. It is found that by the use of a powered nutrunner the row of bolts 126, which are arranged, for example, at 4½ inch centres in a 6 foot wide die can be very quickly removed at the end of a production run. This arrangement is acceptable because, as compared with a conventional extrusion die for molten thermoplastics, the pressure used in the present die is low, being generally of the order of 100 – 200 lbs./sq. inch and being at most 500 lbs./sq. inch. Because the dielips defining the orifice are deeper, it is necessary for the die member 124 to be more massive than the front plate 21 of the die illustrated in FIGS. 1 to 8. In order to adjust the width of the orifice 125 in response to any unevenness in flow along the length of the orifice, the plain die member 121 is provided with a lip member 128, which is clamped to the die member 121 by a series of screws 129, screw threaded into the bottom of member 121 and passing through slightly oversized holes 130 in lip member 128. Intermediate each pair of holes 130, the lip member is formed with threaded holes 131, which are engaged by a threaded portion 132 of an adjuster screw 133. The adjuster screw 133 has a second threaded portion 134, the thread of which is of opposite hand and different pitch to that of the portion 132. The portion 134 is screw threaded into a flanged bush 135, mounted in an aperture in die member 121 and held in position by cap screws 136. The differential adjuster screws 133 allow the position of the lip member to be adjusted with great delicacy right across the width of the orifice and the screws form individual spaced supports for the lip, the spacing between the screws 133 being typically 4 inches. In order to close the gap between the die members at the ends of the defined orifice 125, die member 124 carries end plates 124a.

As stated above, the sole connection between the die members 121 and 124 is constituted by the bolts 126.

At each end of the die member 121 is secured a horizontal frame comprised of a vertical frame plate 140, carrying horizontal frame plates 141, and a front plate 142. The horizontal frame thus formed is secured to die member 121 by bolts 143 and projects horizontally in a forward direction, i.e., towards the ingoing end of the machine.

Slide rails 144 are secured to the frame plates 141 and form a slideway for a slide block 145. An air cylinder 146 is secured to the rear side of the die member 121, which extends beyond the end of die member 124. The piston rod of the cylinder 146 extends through an aperture in die member 121 and is connected to the slide block 145 for longitudinal movement along the rails 144.

The slide blocks 145 adjacent each end of the die member 121 each support a bearing for stub shafts 147 on the axis of the front die member 124. When the bolts 126 have been removed, operation of the air cylinder permits the front die member to be moved away from the rear die member 121 by the amount permitted by the travel of the air cylinder. The die member 124 is thus supported by die member 121 through the bearing blocks 145 and is raised or lowered with the die member 121.

The die member 124 is balanced about its axis on the shafts 147, so that it may be turned into a horizontal position by grasping the handle 150, when fully retracted from the rear die member 121. The die member 124 may be held in the horizontal position while the cleaning of the passages is effected by engaging a bolt 151 in a hole in a bracket 152.

In this position the lower part of the face of the die member 121 is obscured by the die member 124. To permit access to the whole of the operative face of the die member 121 a second position is provided, in which the die member 124 is held at an angle of about 45° to the vertical by engaging the bolt 151 in a second, appropriately positioned hole in bracket 152. With this arrangement the die can be very rapidly opened and its surfaces exposed for cleaning by manual rubbing and scraping in a very short time after the cleaning of the mixer by blowing down a mixture of air and cleaning solvent.

When the die is to be cleaned, it is raised from its operative position and a tray 153 which spans the table 2 and runs on rails extending lengthwise on either side of the table, is moved along its rails into position beneath the die to receive the solvent blown down through the die from the mixer. The die is then opened and cleaned as described above, all the material removed from the die surfaces being discarded into the tray.

This apparatus enables self-supporting layers in the form of sheets of plastics materials and coatings of plastics materials to be prepared from reactive mixes having a very short pot life or gel time, i.e., 1 – 5 minutes. Whereas it has previously been possible to produce such layers from such mixes by spraying techniques the produced layers of the present invention are superior in various ways.

The following are examples of the production of sheet and coated products from a number of reactive mixes having a short pot life at the temperature required for fluidity of the mix or its individual components.

Example 1

Cast Nylon

One component consisting of epsilon caprolactam containing 3 percent metallic potassium is mixed in the manner of the above described apparatus in equal parts with a second component consisting of epsilon caprolactam containing 4 percent of 1:6-bis(caprolactam-N-carbamido)-hexane, and is extruded through the diehead onto an endless release surface moving in relation to the diehead. Prior to mixing, the two components are liquified by heating to 100°C and the diehead temperature is also maintained at 100°C.

The reactive mix, consisting of the above two components, is cast onto the endless release surface and is contained by side walls moving with, or attached to, the release surface. It immediately passes into a heated tunnel containing an atmosphere of dry nitrogen and held at a temperature of 140° – 160°C.

The reactive mix is extruded in the form of a viscous, but readily flowable, material at the rate of about 10 lbs./min./ft. width of die and the release paper is travelling at about 40 ft./min.

Polymerization is complete in 3 minutes and the resulting nylon sheet material can be cooled and stripped from the release surface. The resulting product is a useful engineering raw material.

The pot life of the reactive mix at the mixing temperature of 100°C is about 5 minutes.

At the end of the casting operation the supply of the two components is switched off and a mixture of cleaning solvent and air is admitted to the mixer for about 5 seconds while the clamps or clamping bolts are removed. The cleaning solvent used is Cellosolve acetate (ethylene glycol monoethyl ether acetate) which has a high boiling point and high flashpoint. As soon as the clamping means have been released the die is then opened for completion of the cleaning of all the surfaces of the die members, which have been contacted by the reactive mix. The opening of the die can be completed by competent operators within about one minute from completion of the casting operation.

Example 2

Foam Polyurethane

The following mixture was made up and loaded into one reservoir:

| | | |
|---|---|---|
| Castor Oil | 60 | parts |
| A 1,000 m.w. polyethylene glycol | 30 | parts |
| A silicone surfactant, Imperial Chemical Industries Ltd., Silicocell 380 | 0.2 | part |
| An emulsifier, Armour Hess Ltd., Ethomeen T/25 (an ethoxylated tallow fatty acid) | 0.1 | part |
| Water | 1 | part |
| An amine catalyst (Union Carbide Niax A99) | 0.07 | part |
| A tin catalyst, dibutyl tin dilaurate | 0.05 | part |
| A difunction amine compound, Borden Chemicals, EHR2 | 1 | part |
| China Clay filler | 60 | parts |

When 100 parts of this mixture were reacted with 25 parts of a crude M.D.I. (methylene bis-di-phenyl diisocyanate) a polyurethane foam was formed with a cream time of 30 seconds at 25°C and a gel time or pot life of 3½ minutes.

Crude M.D.I. was loaded into the second reservoir and the two components held at a temperature of 25°C. They were metered in the ratio 100:25 into the mixing chamber which was provided with a small air bleed to provide nucleation to assist the formulation of a uniform, small, cell structure.

The resulting mix was extruded through the diehead at the rate of 10 lbs/min. per foot width of carpet, which was moved past the diehead at the rate of 80 ft./min. to leave a layer of foamed polyurethane having a thickness of one-eighth inch approximately onto the back of a length of tufted carpet moving relative to the diehead. The liquid layer did not penetrate into the carpet because the filler and the reaction product of the diamine and crude M.D.I. produced a slightly thixotropic paste almost immediately. Also, the carpet had previously been treated with an anchor coat of rubber latex to reduce its porosity.

The mixture foamed and gelled on the back of the carpet without the application of further heat but it would obviously be of assistance in a commercial process to have additional heating to ensure complete curing before batch-up.

When it was desired to stop the process, supply of the two components to the mixer was terminated and air and xylene for about 5 seconds was blown through the mixer and die to delay the gelling of the reacting mix in the die and to maintain it in a soft condition whilst the die was opened for manual cleaning of all the die passage surfaces.

Example 3

Porous Polyurethane Sheet 200 parts by weight of a 2,000 m.w. polyethylene glycol adipate at 70°C were mixed with 14 p.b.w. of 1:4 butandiol, 0.15 p.b.w. of DABCO* catalyst and 200 parts by weight of finely ground salt (NaCl) in one reservoir, 44' diphenylmethane diisocyanate was charged into the second reservoir and the two reactants metered into the mixing chamber in the ratio 414:60. (The two components and the diehead being maintained at 70°C.) The mix was extruded at the rate of 10 lbs./min./ft. width onto a silicone coated release paper moving relative to the diehead at the rate of 40 ft./min., where it gelled within 2 minutes.

The urethane elastomer sheet material which results is continuously stripped from the release paper, talced to prevent sticking and rolled up continuously. Subsequently, the salt in the elastomer is removed by causing the polyurethane to swell in a suitable water miscible solvent, e.g. D.M.F.** or acetone, in which state it is leached out with water or water/solvent blends. After removal of salt the elastomer is dried and is now found to be microporous.

After completing a production run the die was cleaned by the procedure indicated in the preceding examples, but using ethyl acetate as the solvent, both in the preliminary blow-down, but also during the subsequent manual cleaning of the die surfaces.
(* DABCO = 1:4 Diazo 2:2:2 bicyclo octane) (DMF** = dimethylformamide).

Example 4

Cold Cure Polyurethane Elastomer Coating

A polyurethane elastomer was formed by metering components A & B, detailed below, into the mixing chamber and extruding the mixture onto the surface of flat mats being carried under the diehead on a conveyor system. The mats were made of 1 inch thick reclaimed polyurethane foam chips and the coating of liquid first formed a soft paste immediately following extrusion (thereby preventing penetration of the chipfoam), then gelled to an elastomer within 2 minutes. The mats were moved past the diehead at 40 ft./min. and the reactive mix was extruded at the rate of 10 lbs./min. per foot width of die.

| Component A | | |
|---|---|---|
| A polyethylene triol of 3,000 m.w. | 50 | parts by weight |
| Dihydroxy ethylaniline | 13.5 | do. |
| Zeolite T paste (zeolite drying agent Bayer Chemicals) | 8.6 | do. |
| 44' Diphenyl diamino methane | 1.0 | do. |
| Dibutyl tin dilaurate catalyst | 0.02 | do. |
| | 73.12 | |
| Component B | | |
| A modified liquid M.D.I. (Upjohn Isonate 143L) | 26.8 | do. |

Pot life of mixture at 20°C is approximately 2 minutes.

When cured the mats were separated by knife, trimmed and were useful as gymnasium and judo mats.

After completion of a production run the die was cleaned as detailed above, employing ethyl acetate as the cleaning solvent.

Example 5

Polyester Resin Coatings

Polyester resins may be produced by metering the following components into the mixer and extruding the resulting reactive mix onto a substrate moving relative to the diehead.

| | | | |
|---|---|---|---|
| a) | Unsaturated polyester resin | 70 parts) | |
| | Styrene monomer | 30 parts) | 100 p.b.w. |
| | (Mixture sold as Crystic 188 *) | | |
| b) | Cyclohexane peroxide | | 4 p.b.w. |
| c) | Cobalt soap containing 0.4% cobalt | | 1 – 4 p.b.w. (depending on required pot life) |

* from Scott Bader Ltd., Wellingborough, England.

The materials are mixed at room temperature and typically cure in under 1 to 5 minutes (have a pot life of 1 to 5 minutes).

Paper or glass fibre webs may be coated or impregnated in this way to yield various useful products. Typically the material is extruded at the rate of 10 lbs./min. per foot width of die and the substrate travels at 60 – 80 ft./min.

The die cleaning operation is carried out as described before employing ethyl acetate as the cleaning solvent.

Example 6

Silicone Rubber Coatings

A silicone rubber coated fabric can be produced by extruding the following reactive mixture onto a fabric moving relative to the diehead.

| | | |
|---|---|---|
| a) | Silicoset 100 (Imperial Chemical Industries Limited) | 99 p.b.w. |
| b) | Silicoset Curing Agent D (Imperial Chemical Industries Limited) | 1 p.b.w. |

The silicoset resin is preferably held at a temperature of 50° – 80°C before mixing with the curing agent and after extrusion the coated fabric is preferably passed through an oven at 100°C. Typically the mixture cures to a silicone elastomer in 1 to 2 minutes.

Such coated fabrics might be useful for the production of self-release belts for other coating processes.

The mixture is extruded at the rate of 7 lbs./min. per foot width of die and the pot life of the mix is about 3 minutes at 50°C.

The cleaning of the die is performed as before, using xylene as the cleaning solvent.

Example 7

Polysulphide Resin Coatings

Coatings of polysulphide resins and rubbers can be made as described above, using the following components.

| | | | |
|---|---|---|---|
| A) | An epoxidized Bisphenol A of equivalent weight 175–210 e.g. Epikote 828 or 818 (Shell Chemicals Ltd.) | 100 | parts by weight |
| B) | A polysulphide liquid polymer (e.g. Thiokol LP3, a mercaptan-terminated long chain diphatic polymer containing disulphide linkages) | 50 | do. |
| C) | A curing agent such as Tridimethylamino methyl phenol | ~10 | do. |
| or | Dimethyl amino propylamine (D.M.A.P.A.) | ~ 7 | do. |

The mixes shown above, when extruded at room temperature, cure in 2 – 5 minutes (have a pot life of 2 – 5 minutes).

After a production run the die is opened and cleaned as explained above, employing xylene as the cleaning solvent.

Example 8

Epoxy Resin Coatings

Epoxy resin coatings can be produced as described above by extruding the following mix.

| | | |
|---|---|---|
| An epichlorhydrin-bisphenol A condensate of equivalent weight 175 – 210 | 100 | parts by weight |
| A polyamide curing agent containing a catalyst such as dibutyl tin dilaurate | 25 | do. |

0.1 percent tin catalyst will give a gel time of approximately 2 minutes at 25°C.

Coated and impregnated papers and fabrics are useful electrical insulating products.

The resin mix is preferably extruded onto the substrate at the rate of 10 lbs./min. per foot width of substrate. The substrate speed is preferably 80 ft./min.

After completing a production run, the die is cleaned as already described, employing xylene as the solvent.

Example 9

Polyurethane Conveyor Belt Covers

These can be produced by extruding the following mix onto a fabric moving relative to the diehead, allowing the mix to gel and continuously reeling the cover.

Component A

A quasi prepolymer composed of the mixture resulting from the reaction of excess pure M.D.I. (methylene diphenyl diisocyanate) with a 2,000 m.w. polyethylene glycol adipate resin, having a free isocyanate content of 12.6 percent.

Component B

A quasi prepolymer composed of the mixture resulting from the reaction of excess mixture of 2,000 m.w. polyethylene glycol and 1:4 butandiol with M.D.I. and containing typically 0.05 percent to 0.07 percent by weight of DABCO catalyst, said prepolymer having a free hydroxyl content of about 5 percent.

The final properties of the urethane elastomer so formed can be altered by the adjustment of the 1:4 butandiol ratio and the overall ratio of A to B. Both components are waxy solids at room temperature and are preferably processed at 60° to 70°C (with diehead at 70°C) in a ratio of 1:1. Other additives, such as carbon black, antihydrolysis agents and surface tension depressants may be added to component B. [Carbon black 1–2%; surface tension depressant (Union Carbide L75) one-fourth percent; antihydrolysis agent carbodiimide, such as Staboxil 1 (Bayer Chemicals Ltd.) 2 percent].

Typical output is 60 – 80 lbs./min. (6 ft. wide), pressures generated within the diehead at 200 p.s.i. but can vary from 50 – 500 p.s.i. and gel time is 1 – 3 minutes, preferably approximately 2 minutes. The physical properties of the urethane elastomer formed are typically:

| | |
|---|---|
| Tensile strength | 5,000 – 8,000 p.s.i. |
| Tear strength (B.S.903) crescent | 60 lb. |
| Elongation at break | 600 % |
| Abrasion resistance | Excellent |

Solvents used for cleaning and purging the diehead are chosen from those that exhibit true solubility for the components. In the example above typical solvents would be ethyl acetate, methylene chloride or a phosphate ester (Reofos 50 ex Geigy, Ltd.). The phosphate ester is chosen because of its high plasticiser boiling point and non-flammable nature.

Example 10

Polybutadiene Elastomer Coatings

Rubbers may be made from carboxyl tipped liquid polybutadiene resins by reacting with epoxy resins and a chromium catalyst (as disclosed by Dr. N. Uri, Rubber World, October, 1971, p. 68). These can be made as unsupported sheet or castings by extruding the following components onto silicone release paper or fabric.

A. A carboxyl terminated polybutadiene e.g. Butarez CTL 11 containing 3.5 percent diisopropylsolicylato Chromium III.

B. A typical epoxy resin epichlorhydrin-bisphenol A condensation product e.g. Shell Chemicals Ltd. Epikote 815.

To achieve rapid cure the components and diehead are heated to 80°C and the coated substrate is cured in an oven at 120° – 150°C.

Cure times may be as low as 3 minutes.

After a production run the die is opened and cleaned as described above, the cleaning solvent being xylene.

The process of the present invention is, subject to the provisos made below, suitable for the production of layers from any type of reactive, resinous mix which can be formed from liquid components, possibly including entrained solids, and which is initially somewhat viscous, but fluid, characteristically having a viscosity of 1 – 20 poises, but possibly extending somewhat above or below these values, which are the viscosity values at the rate of shear imposed on the mixer in passing through the die orifice. The mixes may indeed advantageously exhibit some degree of thixotropy after deposition on the moving substrate. The process of the present invention finds its principal utility with mixes which have a pot life or gel time of 1 – 10 minutes at the temperature at which they are mixed and after such time have become sufficiently set or gelled to permit the material to be coiled without adhesion between adjacent layers. With gel times below 1 minute there is some risk of difficulties with the employed apparatus, whilst with gel times in excess of 10 minutes the material may remain in an adhesive state for an inconveniently long period after extrusion even when supplementary heating means are employed for accelerating the gelling, although mixes having a gel time of 15 minutes, or even longer, may be used with advantage in some circumstances.

The process of the present invention is not readily utilisable for processes in which one or more of the components of the reactive mix is corrosive to the steel dies and is thus unsuitable for mixes containing mineral acids nor is it suitable for use where one or more of the reactants is gaseous.

The preferred extrusion rate of the reactive mix is about 5 – 15 lbs./min. per foot width of die and in order to obtain a layer of greatest uniformity with the distribution passage system in the die illustrated in the drawings, it is found preferable to operate with an internal pressure of the die at about 200 lbs./sq. inch, the die orifice preferably being adjusted so that the desired delivery rate of reactive mix is achieved with an internal die pressure of this value. It is however possible to achieve satisfactory results down to about 50 lbs./sq. inch or even lower. Pressures up to 500 lbs./sq. inch and indeed higher may be employed. However there is no advantage in employing such high pressures with the reactive mixes at present under contemplation, since such high pressures impose unnecessary loading on the supply pumps, mixer and other supply equipment.

I claim:

1. A process for forming a layer of a polymeric resinous material from a multi-component liquid reactive mix which comprises
   i. continuously mixing the liquid components of the reactive mix said mix having a gel time of 1 –10 minutes at the mixing temperature, and said mix being substantially non-corrosive to the steel die used,
   ii. supplying a substantially uniform stream of the mix in a viscous but flowable condition and at a pressure in the range of 20–500 p.s.i. to the input of a steel die rapidly openable to expose the surfaces of all flow passages for manual cleaning by rubbing or scraping,
   iii. advancing the mix through said die through a plurality of paths of equal length and flow resistance and recombining the separate streams into a single laterally extended stream and extruding the laterally extended stream in the form of a layer of substantially uniform thickness in a viscous but flowable condition through an extended slitlike orifice of said die after a time interval comprising a minor fraction of the gel time of said mix, the dwell time of all portions of said mix in said die being substantially equal, and the viscosity of the mix passing through the die orifice being about 1 to about 20 poises,
   iv. maintaining in motion substantially the whole of the mix within the die to avoid dead spots in the flow paths,
   v. moving a receiving surface past said die orifice in a direction transverse to said orifice and in close proximity to said orifice and receiving said layer on said receiving surface,
   vi. periodically discontinuing a supply of mix to said die,
   vii. immediately after such discontinuance introducing and forcing through said die a solvent for at least one of the components of the reactive mix to retard the gelling of said mix,
   viii. rapidly opening said die to expose the whole of the surfaces of the flow passages within said die, and
   ix. manually cleaning said surfaces by rubbing or scraping to remove residual portions of said mix before the same becomes fully gelled to avoid change of flow resistance of the flow paths defined by said passages.

2. A process according to claim 1 in which the reactive mix comprises a prepolymer having free hydroxyl groups, a prepolymer having free isocyanate groups and a catalyst.

3. A process according to claim 1 in which the reactive mix comprises a high molecular weight diol or triol, an isocyanate and a catalyst.

* * * * *